United States Patent [19]

Peterson et al.

[11] Patent Number: 4,612,648
[45] Date of Patent: Sep. 16, 1986

[54] MODULAR GAS LASER END ASSEMBLY

[75] Inventors: Royal D. Peterson, Alpharetta, Ga.; Ronald E. Jones, Cupertino, Calif.

[73] Assignee: Continental Laser Corporation, Mountain View, Calif.

[21] Appl. No.: 692,787

[22] Filed: Jan. 17, 1985

[51] Int. Cl.⁴ .................................................. H01S 3/00
[52] U.S. Cl. ..................................... 372/109; 372/103
[58] Field of Search ................. 372/103, 107, 109, 55, 372/61; 313/49, 51, 623; 350/96.20, 96.21

[56] References Cited

U.S. PATENT DOCUMENTS

| | | | |
|---|---|---|---|
| 3,745,483 | 7/1973 | Huchital et al. | 331/94.5 |
| 3,771,067 | 11/1973 | Kohl et al. | 372/109 |
| 3,792,373 | 2/1974 | Altman et al. | 313/220 |
| 3,984,719 | 10/1976 | Grasis et al. | 313/217 |
| 4,093,927 | 6/1978 | Levine | 331/94.5 |
| 4,185,254 | 1/1980 | Hall et al. | 331/94.5 |

Primary Examiner—William L. Sikes
Assistant Examiner—Robert E. Wise
Attorney, Agent, or Firm—Thomas Schneck

[57] ABSTRACT

An end assembly for a gas laser has a support flange brazed or heliarc welded to a gas reservoir at one end of a laser tube. The flange supports a cathode, a replaceable Brewster angle window, and a replaceable gas feed tube. Ceramic feedthroughs brazed or heliarc welded to holes in the flange bring wires through the flange while maintaining insulation therefrom. The helical cathode is joined to copper stubs from the feedthroughs by crimped sleeves. Brewster angle window and gas pinch-off tube are bolted with nuts onto threaded extensions on the flange. Vacuum seals are provided by compression fittings squeezed between threaded extension and gas pinch-off tube or metal extension member by the nuts. A glass-to-metal bond between metal extension member and glass tube terminating Brewster angle window is made.

6 Claims, 3 Drawing Figures

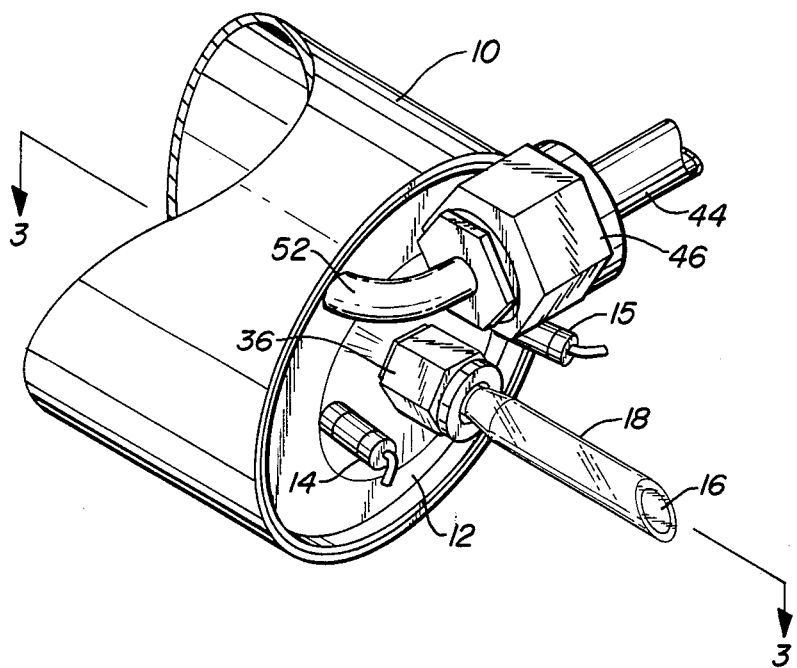
FIG._1.
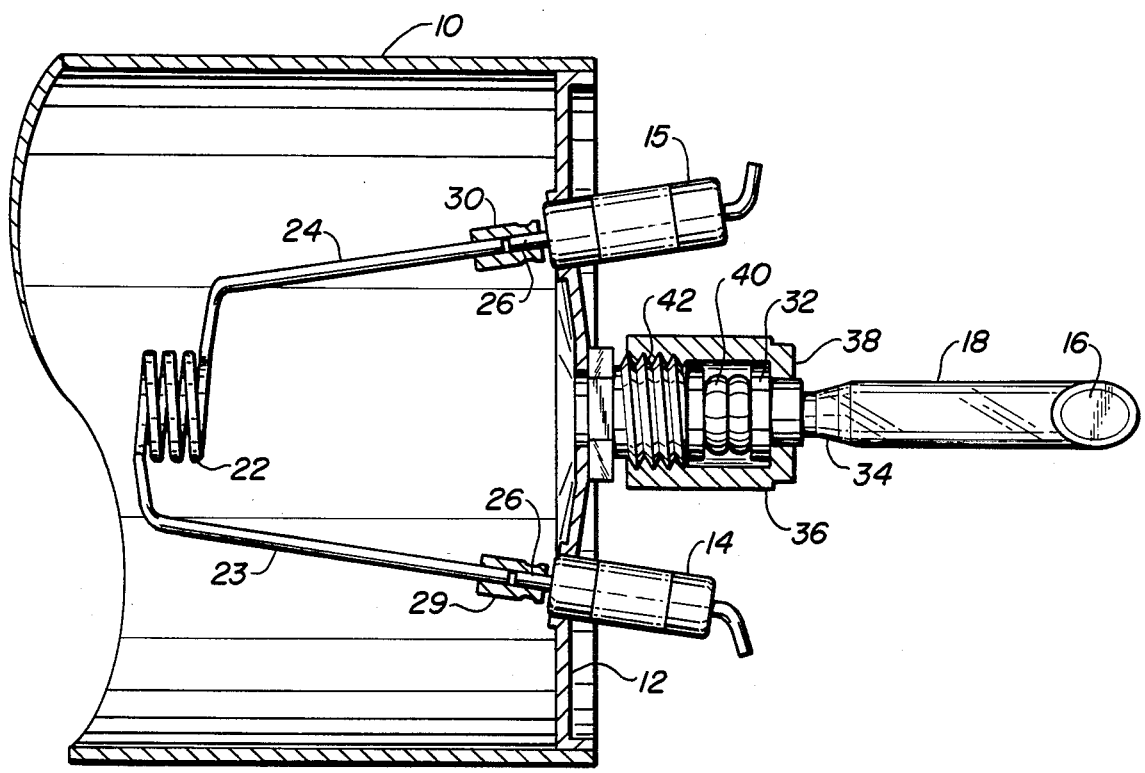
FIG._3.

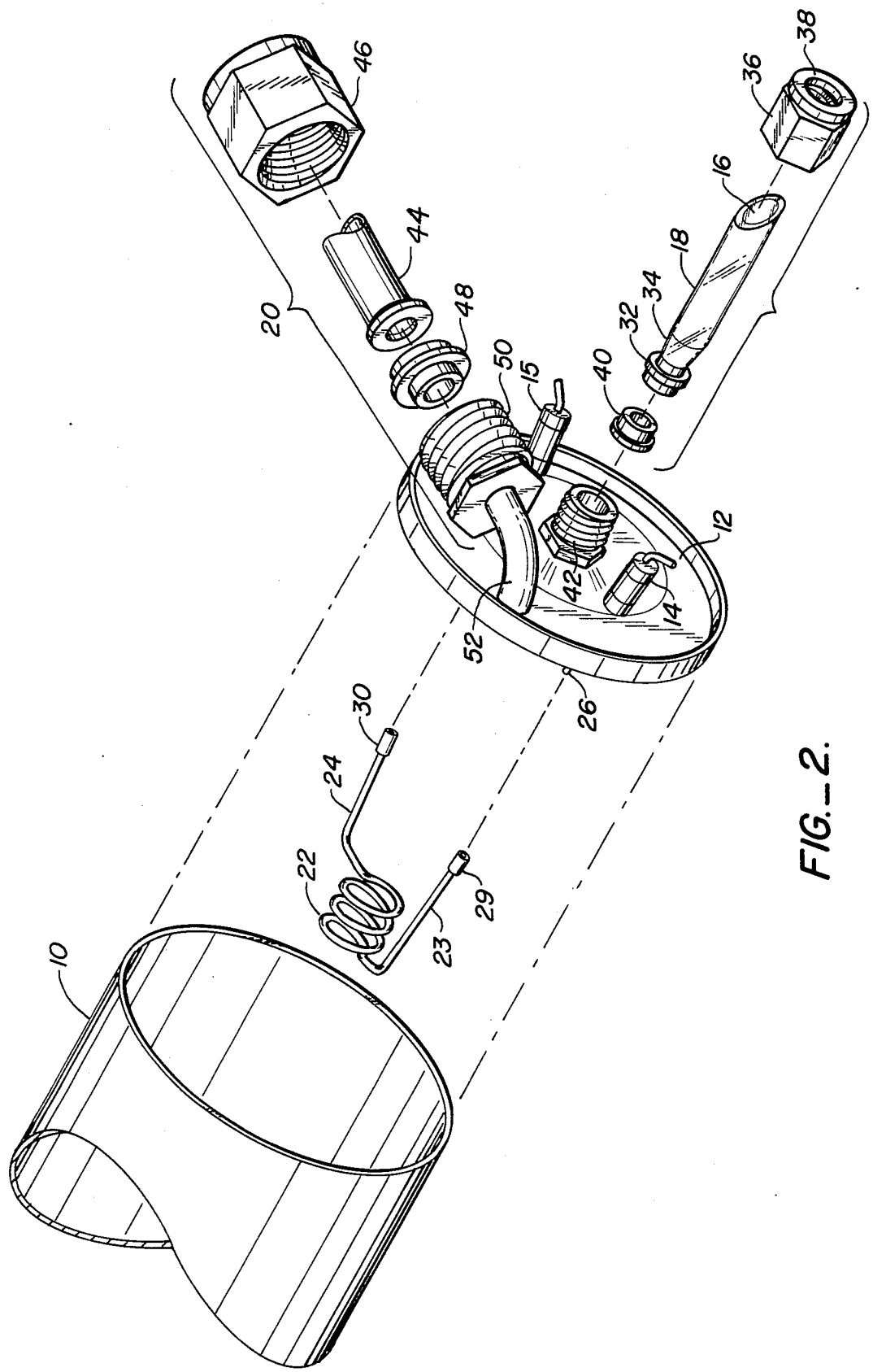
FIG._2.

MODULAR GAS LASER END ASSEMBLY

TECHNICAL FIELD

The present invention relates to an end assembly for a gas-discharge laser and in particular to an assembly in which the Brewster window, and gas fill tube are modular and the laser tube is reprocessable.

BACKGROUND ART

Altman et al. (U.S. Pat. No. 3,792,373) teaches a metal vapor laser in which the room temperature Brewster windows are isolated from the vapor to prevent metal condensation on the windows. The Brewster window is attached to the end of the electrode support tube. At the other end of the electrode support tube is a cathode electrode with a spherical surface. The laser tube is sealed to the electrode support tube by a connecting sleeve assembly with the help of O-rings, pressure limiting rings and threaded collars. The electrode support tube may be removed by disengaging the tube from the correcting sleeve assembly.

Hall et al. (U.S. Pat. No. 4,185,254) teach interchangeable and adjustable windows. They use O-rings which make a vacuum-tight seal between a stainless steel body and each window. Huchital et al. (U.S. Pat. No. 3,745,483) teaches replaceable metal end members having electrodes and Brewster windows. The Brewster windows are sealed to the end members and are not removable. The end members are secured to a glass cylinder through heat resistant gaskets. Hermetic seals are provided by interlocking flanges, overlapping collars, and bolts on the glass and metal members. Levine (U.S. Pat. No. 4,093,927) has Brewster angle windows on end plates which sandwich the rest of the laser assembly and which are drawn together by tie rods, thus placing gaskets under compression forming a vacuum chamber. The problem with these lasers is that when a part of the end assembly needs to be replaced, the laser will need to be evacuated and refilled with gas. This reprocessing is impossible with the prior art. For example, the Brewster window assembly may need replacing, because of breakage or color center formation. Often defects in a Brewster window are not discovered until the laser is filled and operated.

It is an object of the present invention to create a modular end assembly for gas lasers in which the Brewster window, and gas feed tube are each replaceable without destroying the supporting flange and the other elements, so that the laser may be reprocessed.

It is a further object of the invention to create this modular assembly so the replacement of parts is simple and does not require welding of parts to the supporting flange.

DISCLOSURE OF INVENTION

These objects have been met with a modular end assembly for a gas reprocessable laser having a replaceable Brewster angle window, and gas feed tube both associated with a gas reservoir at an end of the laser tube. A supporting flange is welded to the end of the large reservoir where laser gas is contained. Onto this flange is mounted the cathode, window, and tube in such a way that the window and tube may be removed and replaced without damaging the rest of the assembly. Each of the parts can be separately replaced. With this new and useful assembly, a gas laser can now be repaired, evacuated and refilled quickly when one of these parts breaks or is defective instead of throwing the entire expensive laser tube away.

A pair of ceramic feed-throughs bring copper wires through the supporting flange, yet maintain electrical insulation therefrom. Short copper stubs project toward the cathode position from the center of the feed-throughs. The cathode has a pair of wires to be joined to the stubs by means of sleeves or swage tubes which are placed over the feed-through stubs and the cathode wires. The sleeves are then pinched so that the feed-through stubs and the cathode wires are electrically joined through the sleeves.

A Brewster angle assembly is screwed onto both ends of the laser. The assembly is constructed by passing a metal extension member through a nut and then joining a glass tube terminating in a Brewster window to the end of the metal extension. A vacuum compression fitting is placed behind the extension member. When the nut is screwed onto the flange, the extension member gets squeezed by a shoulder on the compression fitting and the nut, forming a seal. The nut, extension member, and compression fitting are standard parts in vacuum technology. Brewster windows, damaged or broken, can be replaced without discarding the entire laser tube.

The support flange is also provided with a screw-on gas pinch-off tube. During fabrication of the laser, the outer end of the tube is connected to vacuum pumping and baking apparatus for initially evacuating the interior portions of the laser, after which the tube is connected to a source of the desired gaseous laser medium to fill the interior portions of the laser with laser gas at the desired pressure. After the completion of the gas filling operation the outer end of the tube is sealed off to complete the vacuum envelope of the laser and enable the desired laser gas pressure to be maintained. Formerly welded to the flange, the tube now is bolted on using a similiar type vacuum compression fitting and nut assembly as is provided for the Brewster windows. Thus, the gas feed tube is easily replaced, and the laser tube can now be reprocessed by evacuation and refilling.

BRIEF DESCRIPTION OF THE DRAWINGS

FIG. 1 is a perspective view of the end assembly.

FIG. 2 is an exploded view of the end assembly of FIG. 1.

FIG. 3 is a sectional view taken on the plane 3—3' of FIG. 1.

BEST MODE FOR CARRYING OUT THE INVENTION

With reference to FIG. 1, a large axially symmetric reservoir 10, at an end of a gas laser tube, where laser gas is confined seats at its end a support flange 12. The laser itself is of the argon ion ceramic type, but is not restricted to this. The lengthwise axis of the laser is collinear with the axis of the reservoir. The flange 12 is a circular metal plate with holes for feed-throughs 14 and 15, the window assembly having Brewster cut window 16, and the gas feed assembly's L-shaped tube 52. The center of the flange 12 may be slightly curved. The flange 12 is heliarc welded or brazed to the reservoir 10.

Feed-throughs 14 and 15 provide electrical connections to a laser cathode. A glass tube 18 terminating in a Brewster angle window 16 bolted to the flange 12 provides a way for light to leave the reservoir 10. The window assembly is vacuum sealed to prevent laser gas from escaping the reservoir. The gas feed tube 44 is also bolted to the flange. The gas feed tube 44 is a means of supplying laser gas to the reservoir when the laser is first constructed and after the laser has been repaired.

With reference to FIG. 2, a large reservoir 10 for confining laser gas is heliarc welded or brazed on its end to the edges of circular metal support flange 12. The flange plate 12 supports the cathode structure, the Brewster window assembly, and the gas feed assembly, which together comprise the end assembly for a gas laser. The flange 12 has holes for feed-throughs 14 and 15, threaded Brewster extension 42, and L-shaped tube 52.

The cathode structure of the end assembly comprises feed-throughs 14 and 15, stubs 26, metal sleeves 29 and 30, cathode wires 23 and 24, and a cathode 22. A pair of ceramic feed-throughs 14 and 15 bring copper wires, for electrical connection to the cathode 22 through the flange 12, yet maintain electrical insulation from the flange 12. Short copper stubs 26 project toward the cathode position from the center of the feed-throughs 14 and 15. The cathode 22 is welded to cathode wires 23 and 24, and is disposed in axial alignment with the reservoir 10. The cathode 22 may be of a helical configuration, as shown, to permit the generated laser beam to pass axially therethrough. The cathode has a pair of wires 23 and 24 to be joined to the stubs by means of sleeves or tubes 29 and 30 which are placed over the feed-through stubs 16 and brazed to the cathode wires 23 and 24. Sleeve 29 is crimped so that stub 26 in feed-through 14 is electrically connected to cathode wire 23. Likewise, crimping sleeve 30 joins cathode wire 24 to stub 26 in feedthrough 15.

The Brewster window assembly comprises a threaded Brewster extension 42, a vacuum compression fitting 40, a metal extension member 32, glass Brewster tube 18, Brewster angle window 16 and nut 36. The Brewster assembly is constructed by passing a metal extension member 32 through a nut 36. The nut 36 has a shoulder 38, which engages an annular flange on extension 32 to prevent the extension 32 from passing all the way through the nut. The metal extension member 32 is joined to a glass tube 18 terminating in a Brewster angle window 16 forming a glass-to-metal bond at 34. A vacuum compression fitting 40 is placed in the nut 36 behind the extension member 32. The fitting 40 is a ring-shaped glass having a shoulder for alignment. The fitting 40 is a standard part in vacuum technology. When the nut 36 is screwed to the threaded Brewster extension 42, the compression fitting 40 gets squeezed between the threaded extension 42 and the metal extension member 32, forming a hermetic seal.

The Brewster window mounting assembly's ability to be unbolted from the support flange 12 facilitates periodic laser maintenance and easy reconstruction. Brewster window tubing 18 frequently damaged or broken, can now be replaced without discarding the entire laser tube. To replace a Brewster window 16, the nut 36 is first unscrewed from the threaded extension 42. The vacuum compression fitting 40 is removed. The metal extension member 32, glass Brewster tube 18, and Brewster angle windows 16 are removed and replaced with a new set. A new fitting 40 is inserted into the nut 36 behind the metal extension member 32, and the nut 36 is screwed onto the threaded extension 42. An identical assembly is mounted to the anode side of the laser tube.

Whenever the window 16 is replaced, the hermetic seal between reservoir 10 and the outside of the laser is broken and the reservoir needs to be evacuated and refilled with laser gas. In order to facilitate this reprocessing the gas feed assembly is also designed to be replaceable. The gas feed assembly comprises an L-shaped tube 52, a threaded extension 50, a vacuum compression fitting 48, a gas pinch-off tube 44, and a nut 46. This assembly works the same way as the Brewster window assembly. A metal L-shaped tube 52 is bonded to the support flange 12. On the end of this L-shaped tube 52 is a threaded extension 50. A gas pinch-off tube 44 is inserted into nut 46. The nut 46 has a shoulder on it to keep the pinch-off tube 44 from slipping completely through the nut 46. The tube 44 is typically made of copper. A vacuum compression fitting 48 is inserted into the nut 46 behind the pinch-off tube 44. When the nut 46 is screwed onto the threaded extension 50, the vacuum compression fitting is compressed, creating a hermetic seal.

During fabrication of the laser, after replacing the Brewster window, or when the laser needs refilling because of gas cleanup or absorption, the outer end of the tube 44 is connected to a vacuum pumping and baking apparatus for evacuating the reservoir 10. Then, the tube is connected to a source of the desired gaseous laser medium, and the reservoir is filled with gas to the desired pressure. After the completion of the gas filling operation, the outer end of the tube 44 is pinched shut to completely seal the reservoir 10, and thus maintain the desired laser pressure.

The tube 44 is designed to be replaced during each repair of the end assembly. The gas pinch-off tube 44 is removed and replaced in the same way as the Brewster window 16. The nut 46 is unbolted from the threaded extension 50. The vacuum compression fitting 48 and pinch-off tube 44 are removed. New pinch-off tube 44 and vacuum compression fitting 48 are inserted into the nut 46, and the nut 46 is screwed onto the threaded extension 50. When this is done, the gas fill assembly can be used to refill the laser reservoir 10 with gas.

FIG. 3 shows section 3—3 of FIG. 1 of the end assembly. The crimped metal sleeves 29 and 30 hold cathode wires 23 and 24 and stubs 26 in electrical contact and supports the cathode 22. The ceramic feedthroughs 14 and 15 are bonded in holes of the support flange 12, and provide passage of wires through the flange 12 while maintaining electrical insulation therefrom.

Vacuum compression fitting 40 is being compressed by threaded extension 42 and metal extension member 32, thereby forming a hermetic seal. The nut shoulder 38 keeps the metal extension member 32 with flange from slipping completely through the nut and applies pressure to the fitting 40 via the extension member 32. Shoulders on the extension member 32 and fitting 40 not only keep these parts from slipping out of the nut 36, but also maintain their relative alignment so leaks do not occur. The center of cathode 22, the threaded extension 42, the vacuum compression fitting 40, the metal extension member 32, the glass tube 18, and the Brewster angle window 16 are all aligned with the central axis of the laser. The cathode 22 is helical and the other parts are roughly cylindrical so that light may propagate along the axis and out the window 16.

We claim:

1. A modular end assembly for a gas laser comprising,
a gas reservoir, mounted at an end of a gas laser tube having a support flange and a cathode, means for replaceably mounting a Brewster angle window to the center of said flange, and means for replaceably mounting a gas feed tube to said flange.

2. The end assembly of claim 1 wherein said means for replaceably mounting a Brewster angle window to said flange comprises, a threaded extension mounted to said flange, a tube terminating in said Brewster angle window, a metal extension member bonded to said tube at the end opposite said window, means for providing a vacuum seal, and a nut screwed into said threaded extension, said nut having a shoulder to secure said metal extension member, said metal extension member being inserted into said nut.

3. The end assembly of claim 2 wherein said means for providing a vacuum seal comprises, a vacuum compression fitting adjacent said threaded extension and said metal extension member in said nut, where said fitting is compressed by said nut.

4. The end assembly of claim 1 wherein said means for replaceably mounting a gas feed tube to said flange comprises, a gas pinch-off tube, an L-shaped tube bonded at one end to said flange and having at the other end a threaded extension, a nut screwed at said extension, and having a shoulder for securing said pinch-off tube, said gas pinch-off tube being inserted into said nut, and a means for providing a vacuum seal.

5. The end assembly of claim 4 wherein said means for providing a vacuum seal comprises, a vacuum compression fitting adjacent said threaded extension and said gas pinch-off tube in said nut, where said fitting is compressed by said nut.

6. A modular end assembly for a gas laser comprising, a gas reservoir mounted at an end of a gas laser tube having a support flange joined to the end of said reservoir, a cathode mounting assembly comprising a helical cathode inside said reservoir, two cathode wires joined to opposite ends of said cathode, two ceramic feedthroughs bonded to said support flange, said feedthroughs having wire centers terminating in stubs, and two metal sleeves fitted over said stubs and over said cathode wires, said sleeves being joined for securing in electrical contact said cathode wires to said stubs, a demountable Brewster window assembly comprising a first threaded extension attached to the center of said flange on the opposite side of said cathode, said extension being hollow for the passage of light therethrough, a glass Brewster tube terminating in a Brewster angle window, a metal extension member bonded to the end of the glass tube distal to the said Brewster angle window, said metal extension member being fitted through a nut with a shoulder, a first vacuum compression fitting in said nut, and adjacent said metal extension member and said first threaded extension, said nut being screwed onto said threaded extension for applying pressure to said metal extension member and to said vacuum compression fitting, and a demountable gas fill assembly comprising an L-shaped tube attached by one end to said flange, a second threaded extension member attached to the other end of said L-shaped tube, a gas pinch-off tube inserted through a nut with a shoulder, and a second vacuum compression fitting in said nut adjacent said second threaded extension and said gas pinch-off tube, said nut being screwed into said second threaded extension for providing pressure to said second vacuum compression fitting.

* * * * *

UNITED STATES PATENT AND TRADEMARK OFFICE
CERTIFICATE OF CORRECTION

PATENT NO. : 4,612,648

DATED : September 16, 1986

INVENTOR(S) : Royal D. Peterson et al.

It is certified that error appears in the above—identified patent and that said Letters Patent is hereby corrected as shown below:

Column 3, line 57, "window tubing 18 frequently damaged or broken..." should read - -window tubing 18 if damaged or broken...- -.

Signed and Sealed this

Sixteenth Day of December, 1986

Attest:

DONALD J. QUIGG

Attesting Officer   Commissioner of Patents and Trademarks